(12) United States Patent
Klose et al.

(10) Patent No.: US 10,686,613 B2
(45) Date of Patent: Jun. 16, 2020

(54) SYSTEM AND METHOD FOR TRANSMITTING POWER OVER DATA LINES

(71) Applicant: AIRBUS OPERATIONS GMBH, Hamburg (DE)

(72) Inventors: Peter Klose, Hamburg (DE); Wolfgang Fischer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/233,464

(22) Filed: Aug. 10, 2016

(65) Prior Publication Data

US 2017/0048073 A1    Feb. 16, 2017

(30) Foreign Application Priority Data

Aug. 11, 2015   (EP) ..................... 15180543

(51) Int. Cl.
*H04L 12/10*    (2006.01)
*H04L 12/28*    (2006.01)
*H04L 12/40*    (2006.01)

(52) U.S. Cl.
CPC .......... *H04L 12/10* (2013.01); *H04L 12/2816* (2013.01); *H04L 12/40045* (2013.01); *H04L 2012/4028* (2013.01)

(58) Field of Classification Search
CPC ....................................................... H04B 3/54
See application file for complete search history.

(56) References Cited

U.S. PATENT DOCUMENTS 7,117,272 B2    10/2006  Rimboim et al.
7,804,189 B2 *   9/2010  Koehler ................ H02J 1/08
                                                     307/31

(Continued)

FOREIGN PATENT DOCUMENTS

CN    1943163 A    4/2007
CN   104243176 A   12/2014

(Continued)

OTHER PUBLICATIONS

First Chinese Office Action and First Search for Chinese Application No. 201610714794.7 dated Feb. 2, 2019.

*Primary Examiner* — Shuwang Liu
*Assistant Examiner* — Gina M McKie
(74) *Attorney, Agent, or Firm* — Jenkins, Wilson, Taylor & Hunt, P.A.

(57) ABSTRACT

A network includes a power over data link, a data switch coupled to a data bus and configured to transmit and/or receive data from and/or to the data bus via the power over data link, and a service device coupled to the data switch via the power over data link and configured to transmit and/or receive data from and/or to the data switch via the power over data link. The service device has a power splitter to split the data signal of the power over data link from the power supply, service functions coupled to the power splitter and configured to receive power from the power splitter, and a voltage comparator coupled to the power splitter. The voltage comparator is configured to detect voltage level of the power supply, and based on the detected voltage level, to selectively activate and/or deactivate one or more of the service functions.

11 Claims, 2 Drawing Sheets

(56) References Cited

U.S. PATENT DOCUMENTS

| | | | |
|---|---|---|---|
| 8,212,381 B2 | 7/2012 | Riedel et al. | |
| 8,509,422 B2* | 8/2013 | Wang | H04M 19/001 |
| | | | 340/333 |
| 9,209,981 B2 | 12/2015 | Health et al. | |
| 2005/0243861 A1* | 11/2005 | Elkayam | H04L 12/10 |
| | | | 370/466 |
| 2009/0284934 A1* | 11/2009 | Nielsen | H05K 7/1461 |
| | | | 361/730 |
| 2010/0264727 A1* | 10/2010 | Riedel | H02J 1/00 |
| | | | 307/9.1 |
| 2010/0287395 A1* | 11/2010 | Huang | G06F 1/32 |
| | | | 713/323 |
| 2012/0145490 A1* | 6/2012 | Clary | B60T 8/1703 |
| | | | 188/1.11 E |
| 2013/0329330 A1* | 12/2013 | Srinivas | H02H 9/002 |
| | | | 361/93.9 |

FOREIGN PATENT DOCUMENTS

| | | |
|---|---|---|
| CN | 106452800 B | 8/2019 |
| DE | 10200800702.3 | 8/2009 |
| EP | 2819343 | 12/2014 |

\* cited by examiner

SYSTEM AND METHOD FOR TRANSMITTING POWER OVER DATA LINES

CROSS-REFERENCE TO RELATED APPLICATION

This application claims priority to European Patent Application EP 15 180 543.9 filed Aug. 11, 2015, the entire disclosure of which is incorporated by reference herein.

TECHNICAL FIELD

The present disclosure relates to a system and a method for transmitting power over data lines, specifically for use on board of aircraft or spacecraft.

BACKGROUND

Power over data (PoD) technologies have become ubiquitous for supplying electric energy to distributed devices over conventional data communication links. Particularly, power over Ethernet (PoE) technologies are gaining widespread use in ad-hoc systems which pass electrical power along with data on Ethernet cabling. PoD and specifically PoE are very efficient solutions if both data and power connections are to be led in one cable, so that equipment supplied with PoD/PoE does not require separate cables for data links and power supply. Therefore, PoD/PoE technology offers great advantages for devices with modest power consumption and high and/or constant data throughput. Employing PoD/PoE technologies saves costs for cabling, allows for remote cycling of power supply and guarantees a high data throughput.

Several approaches for improving the flexibility and functional capabilities of PoD/PoE technologies have already been made. For example, document EP 2 819 343 A1 discloses a method for changing an operating mode of a processing unit of a network node which is connected to a combined data communication and power supply line in which changes of the supply voltage of the combined data communication and power supply line are monitored and an operation mode of the processing unit is set based on a determined change of the supply voltage. Document DE 10 2008 007 023 A1 discloses a method for the voltage supply of aircraft cabin modules, in particular of safety-relevant modules in an aircraft cabin by a combined transmission of data and a supply voltage wherein the level of the supply voltage may be varied.

SUMMARY

One of the ideas of the disclosure herein is to provide solutions for improving the reliability and availability of network devices in a PoD/PoE network.

A first aspect of the disclosure pertains to a network comprising a power over data link, a data switch coupled to a data bus and configured to transmit and/or receive data from and/or to the data bus via the power over data link, and a service device coupled to the data switch via the power over data link and designed or configured to transmit and/or receive data from and/or to the data switch via the power over data link. The service device comprises a power splitter configured to split the data signal of the power over data link from the power supply, a plurality of service functions coupled to the power splitter and configured to receive power from the power splitter, and a voltage comparator coupled to the power splitter. The voltage comparator is configured to detect a voltage level of the power supply. Based on the detected voltage level, the voltage comparator is then configured to selectively activate and/or deactivate one or more of the plurality of service functions.

According to a second aspect of the disclosure, a method for transmitting power over data lines comprises transmitting a combined power and data signal from a data switch via a power over data link to a service device comprising a plurality of service functions, splitting the data signal of the power over data link from the power supply signal in the service device, detecting a voltage level of the power supply signal in the service device; and selectively activating and/or deactivating one or more of the plurality of service functions based on the detected voltage level.

The idea on which the present disclosure is based is to enhance power over data (PoD) technology to transfer power and data in a network from a source device over a single PoD link to one or more end devices. The source device may be supplied with different supply voltages from different power sources. The source device monitors the available power type and injects the power on the PoD link to the end device. The end device extracts the power from the PoD link and evaluates the voltage level of the supplied power. Depending on the evaluated voltage level, a selected group of service functions in the end device may be supplied with power, while the remaining service functions may be kept deactivated.

One of the advantages associated with such a network is the possibility to use a single connection for data transmission and power supply. Additionally, the change of the operating mode for the end device and particularly the selection of activated service functions in the end device may be effected by the selection of the supply voltage level only. This facilitates as secure, reliable and efficient operating mode switching without having to rely on additional data communication or changes in the software used for data communication.

Moreover, the individual service functions of the end device do not need to be adapted for different supply voltage levels since the power may be selectively activated or deactivated for the respective service functions depending on the monitored voltage level. Thus, the design and power supply requirements of the service functions may be simplified.

According to an embodiment of the network, the data switch may comprise a power injector configured to transmit and/or receive data from and/or to the data bus and combine it with the supply voltage of one of at least two power sources to form a power over data signal to be transmitted via the power over data link. In one embodiment, the supply voltages may include voltage levels of 42 VDC and 28 VDC. This is particular advantageous for networks on board of aircraft and spacecraft where a 42 VDC supply voltage is used for normal operation and a 28 VDC supply voltage may be supplied as backup for so-called essential operation.

According to a further embodiment of the network, the service device may be a passenger service unit of an aircraft. In one embodiment, the power splitter may be a passenger interface and supply adapter. Passenger service units (PSU) with passenger interface and supply adapters (PISA) are regularly employed as distributed network elements associated with passenger seats in an aircraft. The PSUs may be part of a cabin communication data system (CIDS) which employs decoder/encoder units (DEUs) as intermediate distributed network switches connected to a central CIDS data bus.

According to another embodiment of the network, the plurality of service functions may comprise one or more of a fasten seatbelt sign, a passenger call light, a passenger call button, a reading light, a reading light button, a no smoking sign and a loudspeaker. In normal operation, the PSU employing those service functions may keep all those service functions available or activated. In case of essential operation, only the loudspeaker function may be mandatorily active, while all the other service functions may be temporarily deactivated in order to save power. Only the driver circuit of the loudspeaker may be supplied with power, while the power supply of the driver circuits of the remaining service functions may be deactivated.

According to another embodiment of the network, the service device may comprise a data controller coupled to the power splitter and the service functions and configured to receive data from the power splitter and to control the service functions based on the received data.

According to another embodiment of the network, the service device may further comprise a plurality of voltage converters coupled between the power splitter and respective ones of the plurality of service functions. This has the advantage, that the centrally supplied supply voltage over the PoD link may be conveniently converted locally in the service device to other voltage levels as required by the various service functions.

According to another embodiment of the network, the voltage comparator may be coupled to the plurality of voltage converters and configured to connect or disconnect the plurality of voltage converters based on the detected voltage level. This allows for a power efficient operation of the service device under power critical conditions since the supply paths for the deactivated service functions may be completely shut down.

According to an embodiment of the method, the supply voltages may include voltage levels of 42 VDC and 28 VDC.

According to a further embodiment of the method, the plurality of service functions may comprise one or more of a fasten seatbelt sign, a passenger call light, a passenger call button, a reading light, a reading light button, a no smoking sign and a loudspeaker.

According to a further embodiment of the method, the service device may further comprise a plurality of voltage converters coupled between a power splitter of the service device and respective ones of the plurality of service functions. In one embodiment, the selectively activating and/or deactivating may comprise connecting or disconnecting the plurality of voltage converters to or from the power splitter based on the detected voltage level.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
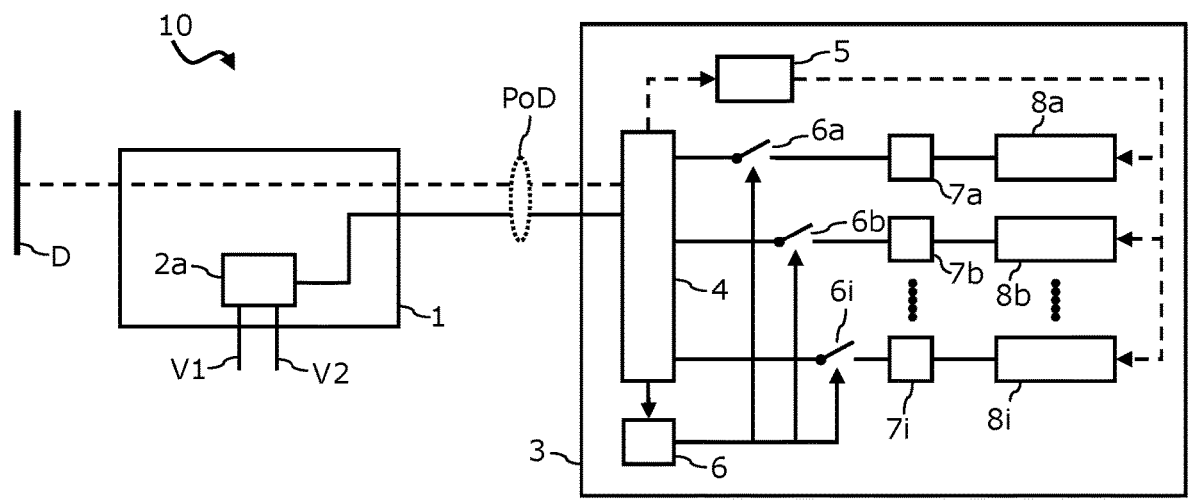
FIG. 1 schematically illustrates a block diagram of a network according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

FIG. 1 shows a schematic illustration of a network 10. The network 10 generally comprises a data switch 1 which is coupled to a data bus D, a power over data link PoD and a service device 3 coupled to the data switch 1 via the power over data link PoD. While only a single data switch 1, a single power over data link PoD and a single service device 3 are exemplarily depicted in FIG. 1, it should be understood that more than one data switch 1, power over data link PoD and/or service device 3 may be provided. Furthermore, it may be possible that one data switch 1 may be supplying at least two service devices 3 with power and data over power over data links PoD. The service devices 3 may be arranged in parallel or in daisy chain configuration. The data bus D may be a central data bus in the network 10 which centrally provides data to all data switches 1.

Figure 4:
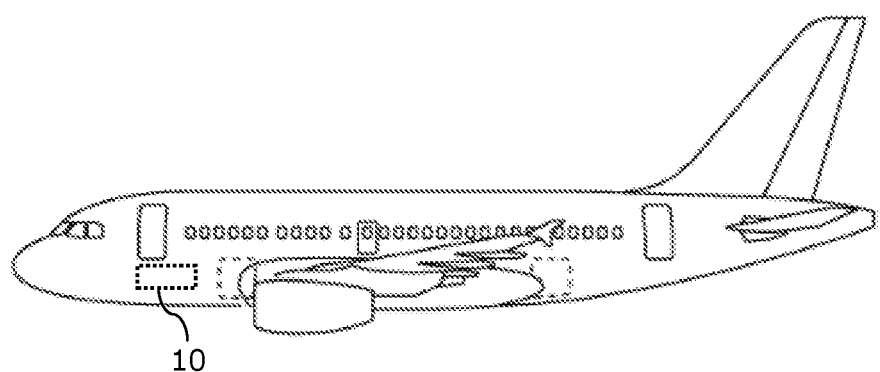
FIG. 4 schematically illustrates an aircraft having a network of FIG. 1 or 2 according to another embodiment of the disclosure herein.

The network 10 may for example be a cabin communication data system (CIDS) on board of an aircraft or spacecraft, such as an aircraft as exemplarily shown in FIG. 4. The data switch 1 may be a decoder/encoder unit (DEU) of the CIDS, and the service device 3 may be a passenger service unit (PSU). The data switch 1 is coupled to a data bus D, for example a data bus D of a CIDS on board of an aircraft or spacecraft. The data switch 1 may act as a data relay between a central communication server of the CIDS and one or more service devices 3. In that regard, the data switch 1 is configured to transmit and/or receive data from and/or to the data bus D via the power over data link PoD. A service device 3 that is coupled to the data switch 1 via the power over data link PoD may be then configured to respectively receive and/or transmit data to and/or from the data switch 1 via the power over data link PoD.

The service device 3 may specifically comprise a power splitter 4, for example a passenger interface and supply adapter (PISA) in case of a PSU as service device 3. The power splitter 4 may be configured to receive the combined power and data signal over the power over data link PoD and split the combined signal into a data signal and a power supply signal. The power supply may be forwarded to a plurality of service functions—of which three service functions 8a, 8b, 8i are exemplarily depicted in FIG. 1—that are coupled to the power splitter 4. The plurality of service functions 8a, 8b, 8i may for example be typical service functions of a PSU, such as a fasten seatbelt sign, a passenger call light, a passenger call button, a reading light, a reading light button, a no smoking sign and a loudspeaker. Of course, the number of service functions 8a, 8b, 8i is not limited to three, but may be any other number smaller or greater than three as well.

The service device 3 may further comprise a data controller 5 that is coupled to the power splitter 4. The power splitter 4 forwards the split data signal to the data controller 5 which in turn is responsible for controlling the desired behaviour of the service functions 8a, 8b, 8i. For example, the data controller 5 may output voice data over a loudspeaker, light up the no smoking sign and the fasten seatbelt sign during taxi, take-off and landing or detect a press of a passenger call button and send back the information on the button press to the DEU. The data controller 5 may not necessarily need to be implemented as a single or separate component of the service device 3, as exemplarily depicted in FIG. 1. Instead, it may also be possible to have an integrated data control logic component in each or at least some of the service functions 8a, 8b, 8i which directly receives the relevant data.

While the data controller 5 may be configured to control the service functions 8a, 8b, 8i based on the received data from the power splitter 4, the service device 3 further comprises a voltage comparator 6 coupled to the power splitter 4 which is responsible for controlling an operational state of the service functions 8a, 8b, 8i based on properties of the received power supply signal. The voltage comparator 6 is specifically configured to detect a voltage level of the power supply.

For example, the voltage level of the power supply signal that is injected into the power over data link PoD may take on various values. On board of an aircraft, for example, there may be a normal voltage level of 115 VAC and a backup voltage level ("essential voltage") of 28 VDC. Depending on the availability of the different power supplies, the data switch 1 may combine the data link with the supply voltage V1, V2 of one of at least two voltage sources to form a power over data signal to be transmitted via the power over data link PoD.

To that end, the data switch 1 may be PoD/PoE-enabled and comprise a supply voltage generator 2a that is coupled to at least two different power sources which provide the various voltage levels. The supply voltage generator 2a may for example directly and select one of the power sources to supply the power with a respective voltage level. However, the supply voltage generator 2a may also convert an initial voltage level of a selected power source to a different voltage level to be injected into the power over data link PoD. Furthermore, it may be possible for the supply voltage generator 2a to draw power from more than one of the coupled and available power sources to combine their respective voltage levels to a desired intermediate voltage level to be injected into the power over data link PoD. The values of the different supply voltage levels may be chosen depending on the field of application of the network 10 and on the respective output of the power sources available, for example, it may be possible to choose 42 VDC and 28 VDC as potential supply voltage levels in the supply voltage generator 2a. Moreover, the number of the power sources may not be limited to two, but may be any other larger number as well.

The voltage comparator 6 is able to detect the voltage level of the power supply received over the power over data link PoD. Based on the detected voltage level, the voltage comparator 6 is then configured to selectively activate and/or deactivate one or more of the plurality of service functions 8a, 8b, 8i based on the detected voltage level.

For example, during normal operation when a regular power source with sufficient power is available, all service functions 8a, 8b, 8i may be kept fully operable. However, during a backup or emergency situation, the regular power source may not be available. In that case, only a backup power source with limited power may be available and the service device 3 may limit the operability of the service functions 8a, 8b, 8i to a subset of service functions which are deemed to be essential. For example, in a PSU on board of an aircraft the loudspeaker may be the only service function that is mandatory in order to relay voice message from the flight crew to the passengers. The passenger reading light, the passenger call button and other convenience functions may be kept inoperable in order to reduce the power consumption to a minimum.

It should, however, be understood that the choice of service functions or subsets of service functions for activation or deactivation may be different than in the example as explained above and may depend on the field of application of the network 10 and the type and nature of the service functions, particularly their perceived importance in the respective application.

For activating and/or deactivating the service functions, the service device 3 may comprise a plurality of voltage converters 7a, 7b, 7i that are coupled between the power splitter 4 and respective ones of the service functions 8a, 8b, 8i. The voltage converters 7a, 7b, 7i may be connected to or disconnected from the power splitter 4, for example by switches 6a, 6b, 6i that are under control of the voltage comparator 6. The voltage comparator 6 may in this example be configured to activate or deactivate the switches 6a, 6b, 6i based on the detected voltage level. Alternatively or additionally, the voltage comparator 6 may be configured to directly activate or deactivate the voltage converters 7a, 7b, 7i by outputting respective activation or deactivation signals to control inputs of the voltage converters 7a, 7b, 7i. It should be understood that other possibilities for selectively deactivating one or more of the service functions 8a, 8b, 8i may be available for the voltage comparator 6 as well. In case of distributed data controller elements which may be integrated into the service functions 8a, 8b, 8i, the voltage comparator 6 may deactivate the respective data controller elements along with the service functions 8a, 8b, 8i as well so that the power consumption is reduced further: In that case, only the data controller elements of the remaining active service functions need to be supplied with power, while the data controller elements of the inactive service functions remain cut off from the power supply.

Figure 2:
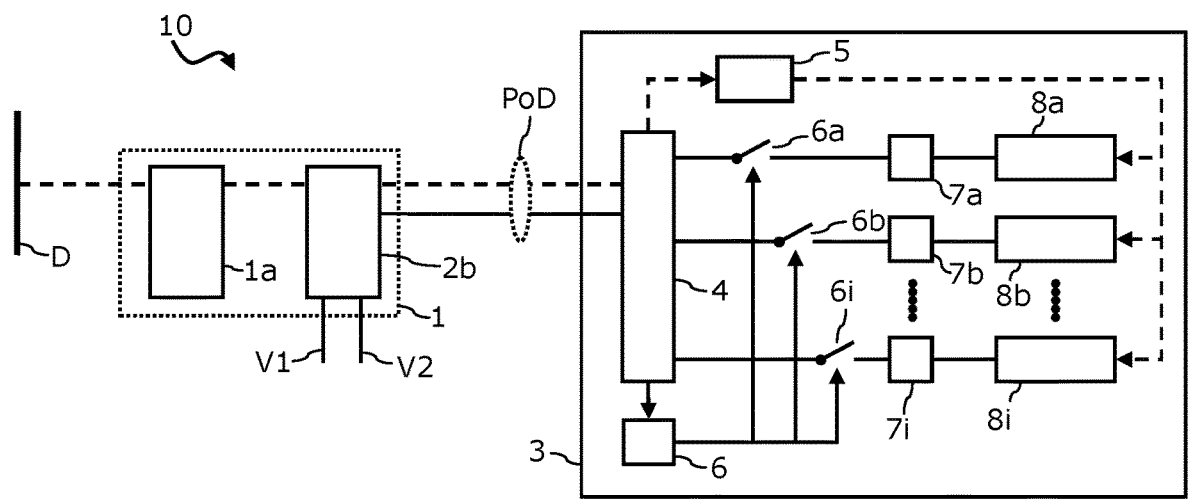
FIG. 2 schematically illustrates a block diagram of another network according to a further embodiment of the disclosure herein.

FIG. 2 shows a schematic illustration of a network 10 according to an alternative setup as the network 10 depicted in FIG. 1. The network 10 of FIG. 2 differs from the network 10 in FIG. 1 mainly in that the data switch 1 may comprise a non-PoD/PoE-enabled data encoding/decoding unit 1a that is responsible for generating the data signal as it would be transmitted separately to the service devices 3. The data switch 1 may then comprise a power injector 2b downstream of the data encoding/decoding unit 1a. The power injector 2b is coupled to at least two power sources and may be configured to combine the data signal of the data encoding/decoding unit 1*a* with the supply voltage V1; V2 of one of at least two power sources coupled to the power injector 2*b*. Thus, the power injector 2*b* may form a power over data signal to be transmitted via the power over data link PoD.

The power injector 2*b* may for example directly and select one of the power sources to supply the power with a respective voltage level V1 or V2. However, the power injector 2*b* may also convert an initial voltage level of a selected power source to a different voltage level to be injected into the power over data link PoD. Furthermore, it may be possible for the power injector 2*b* to draw power from more than one of the coupled and available power sources to combine their respective voltage levels to a desired intermediate voltage level to be injected into the power over data link PoD. The values of the different supply voltage levels may be chosen depending on the field of application of the network 10 and on the respective output of the power sources available, for example, it may be possible to choose 42 VDC and 28 VDC as potential supply voltage levels in the power injector 2*b*. Moreover, the number of the power sources may not be limited to two, but may be any other larger number as well.

Figure 3:
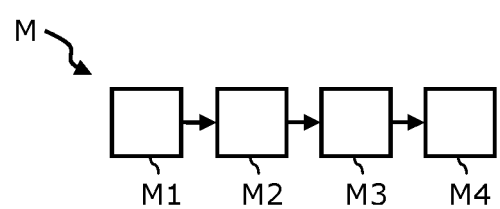
FIG. 3 schematically illustrates stages of a method for transmitting power over data lines according to another embodiment of the disclosure herein.

FIG. 3 schematically illustrates stages of a method M for transmitting power over data lines, for example in one of the networks 10 as described in conjunction with FIG. 1 or 2. In a first step M1, the method M may comprise transmitting a combined power and data signal from a data switch 1 via a power over data link PoD to a service device 3 comprising a plurality of service functions, such as for example a fasten seatbelt sign, a passenger call light, a passenger call button, a reading light, a reading light button, a no smoking sign and a loudspeaker. In a second step M2, the data signal of the power over data link PoD may be split from the power supply signal in the service device 3. The service device 3 may in a step M3 then detect a voltage level of the power supply signal, for example supply voltage levels of 42 VDC and 28 VDC, and selectively activate and/or deactivate one or more of the plurality of service functions based on the detected voltage level in a step M4.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A cabin communication data system comprising:
    a data bus;
    a power over data link;
    a network data switch coupled between the data bus and the power over data link, the network data switch being configured to transmit and/or receive data from and/or to the data bus via the power over data link; and
    a service device coupled to the network data switch via the power over data link and configured to transmit and/or receive data from and/or to the network data switch via the power over data link, with the network data switch acting as a data relay between a central communication server of the cabin communication data system and the service device;
    the service device comprising:
        a power splitter configured to split a data signal of the power over data link from a power supply;
        a plurality of service functions coupled to the power splitter and configured to receive power from the power splitter; and
        a voltage comparator coupled to the power splitter and configured to detect a voltage level of the power supply and configured to selectively activate and/or deactivate one or more of the plurality of service functions based on the detected voltage level;
    wherein the network data switch comprises a power injector configured to transmit and/or receive data from and/or to the data bus and combine the data with a supply voltage of one of at least two power sources to form a power over data signal to be transmitted via the power over data link, and
    wherein the at least two power sources include a first power source configured to supply a normal supply voltage and a second power source configured to supply a backup supply voltage, and wherein the service device is configured to selectively deactivate at least a first service function in response to detecting, at the voltage comparator, that the voltage level of the power supply output by the power splitter corresponds to the backup supply voltage.

2. The cabin communication data system of claim 1, wherein the service device is a passenger service unit of an aircraft.

3. The cabin communication data system of claim 2, wherein the power splitter is a passenger interface and supply adapter.

4. The cabin communication data system of claim 1, wherein the plurality of service functions comprise one or more of a fasten seatbelt sign, a passenger call light, a passenger call button, a reading light, a reading light button, a no smoking sign and a loudspeaker.

5. The cabin communication data system of claim 1, wherein the service device comprises a data controller coupled to the power splitter and the service functions and configured to receive data from the power splitter and to control the service functions based on the received data.

6. The cabin communication data system of claim 1, wherein the service device further comprises a plurality of voltage converters coupled between the power splitter and respective ones of the plurality of service functions.

7. The cabin communication data system of claim 6, wherein the voltage comparator is coupled to the plurality of voltage converters and configured to connect or disconnect the plurality of voltage converters based on the detected voltage level.

8. A method for transmitting power over data lines in a cabin communication data system comprising a data bus, the method comprising:
  transmitting a combined power and data signal from a network data switch coupled to the data bus via a power over data link to a service device comprising a plurality of service functions, the network data switch acting as a data relay between a central communication server of the cabin communication data system and the service device;
  splitting the data signal of the power over data link from the power supply signal in the service device;
  transmitting and/or receiving data from and/or to the data bus and combining the data with a supply voltage of one of at least two power sources to form a power over data signal to be transmitted via the power over data link;
  detecting a voltage level of the power supply signal in the service device; and
  selectively activating and/or deactivating one or more of the plurality of service functions based on the detected voltage level;
  wherein the at least two power sources include a first power source configured to supply a normal supply voltage and a second power source configured to supply a backup supply voltage, and wherein the method comprises selectively deactivating at least a first service function in response to detecting that the voltage level of the power supply signal in the service device corresponds to the backup supply voltage.

9. The method of claim 8, wherein the plurality of service functions comprise one or more of a fasten seatbelt sign, a passenger call light, a passenger call button, a reading light, a reading light button, a no smoking sign and a loudspeaker.

10. The method of claim 8, wherein the service device further comprises a plurality of voltage converters coupled between a power splitter of the service device and respective ones of the plurality of service functions, and wherein the selectively activating and/or deactivating comprises connecting or disconnecting the plurality of voltage converters to or from the power splitter based on the detected voltage level.

11. An aircraft comprising a cabin communication data system, the cabin communication data system comprising:
  a data bus;
  a power over data link;
  a network data switch coupled between the data bus and the power over data link, the network data switch being configured to transmit and/or receive data from and/or to the data bus via the power over data link; and
  a service device coupled to the network data switch via the power over data link and configured to transmit and/or receive data from and/or to the network data switch via the power over data link, with the network data switch acting as a data relay between a central communication server of the cabin communication data system and the service device;
  the service device comprising:
    a power splitter configured to split a data signal of the power over data link from a power supply;
    a plurality of service functions coupled to the power splitter and configured to receive power from the power splitter; and
    a voltage comparator coupled to the power splitter and configured to detect a voltage level of the power supply and configured to selectively activate and/or deactivate one or more of the plurality of service functions based on the detected voltage level;
  wherein the network data switch comprises a power injector configured to transmit and/or receive data from and/or to the data bus and combine the data with a supply voltage of one of at least two power sources to form a power over data signal to be transmitted via the power over data link, and
  wherein the at least two power sources include a first power source configured to supply a normal supply voltage and a second power source configured to supply a backup supply voltage, and wherein the service device is configured to selectively deactivate at least a first service function in response to detecting, at the voltage comparator, that the voltage level of the power supply output by the power splitter corresponds to the backup supply voltage.

* * * * *